March 11, 1930.  H. R. LEWIS  1,750,414
MACHINE FOR TREATING TOMATOES
Filed March 26, 1925    4 Sheets-Sheet 1
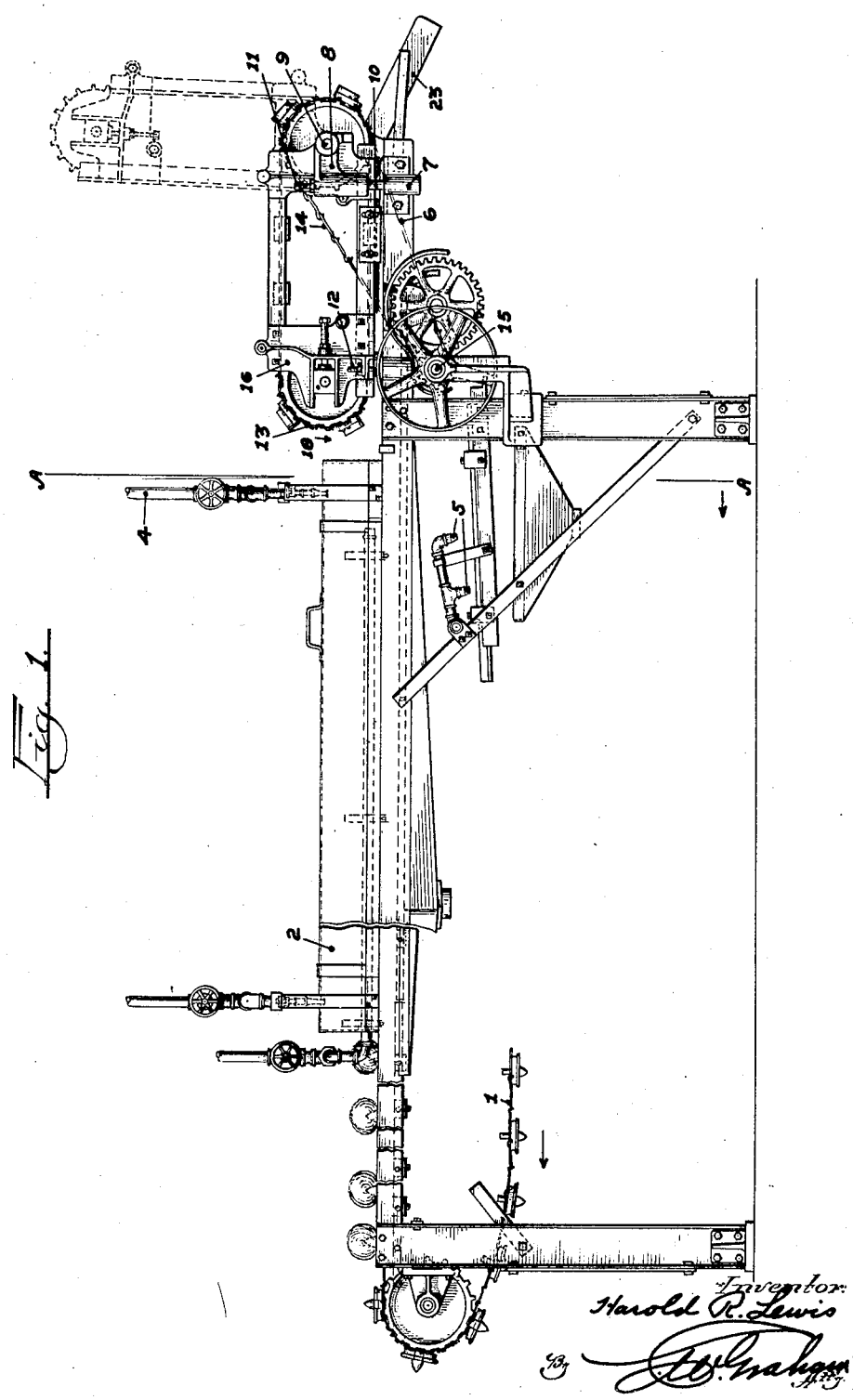

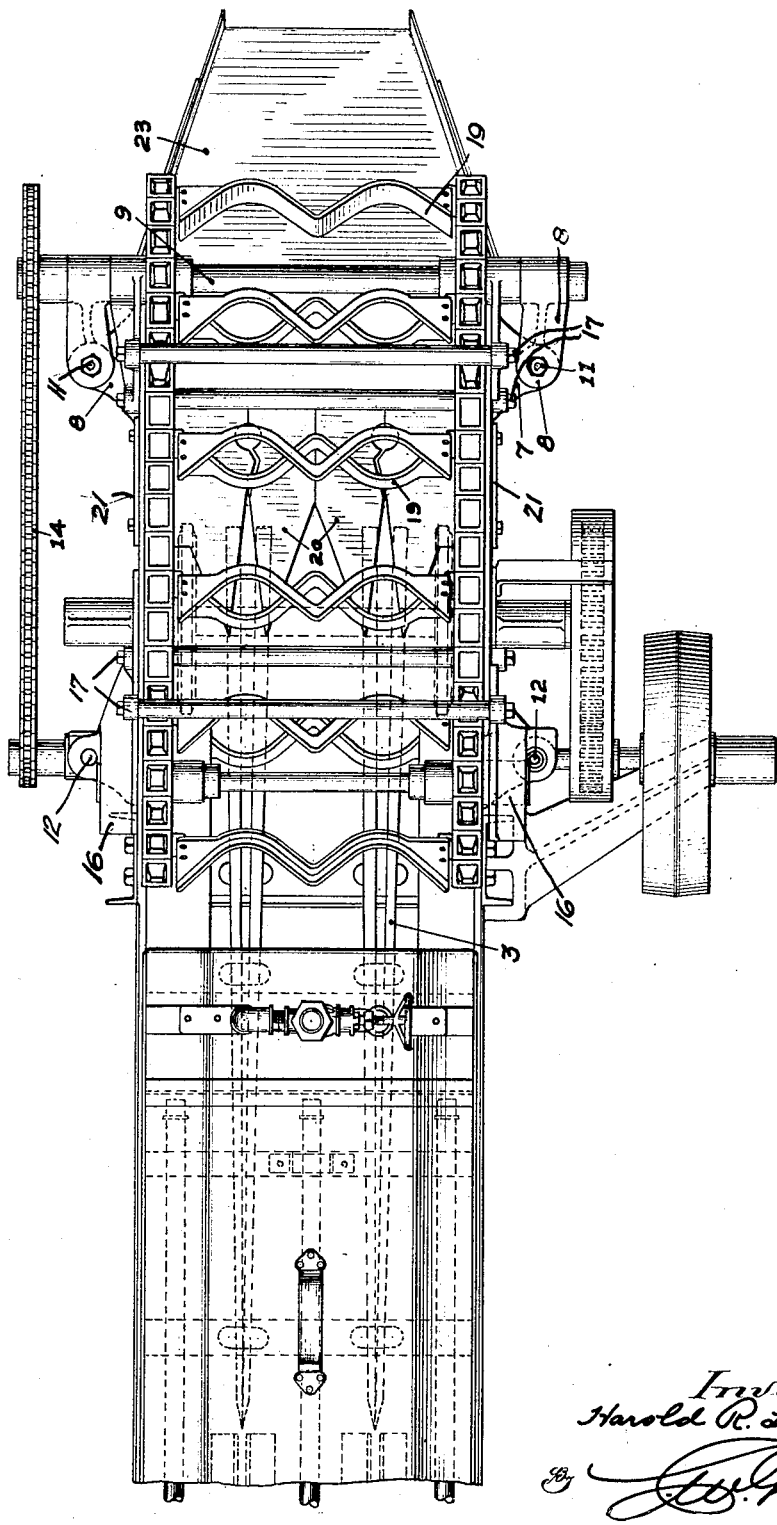

March 11, 1930.  H. R. LEWIS  1,750,414
MACHINE FOR TREATING TOMATOES
Filed March 26, 1925    4 Sheets-Sheet 3
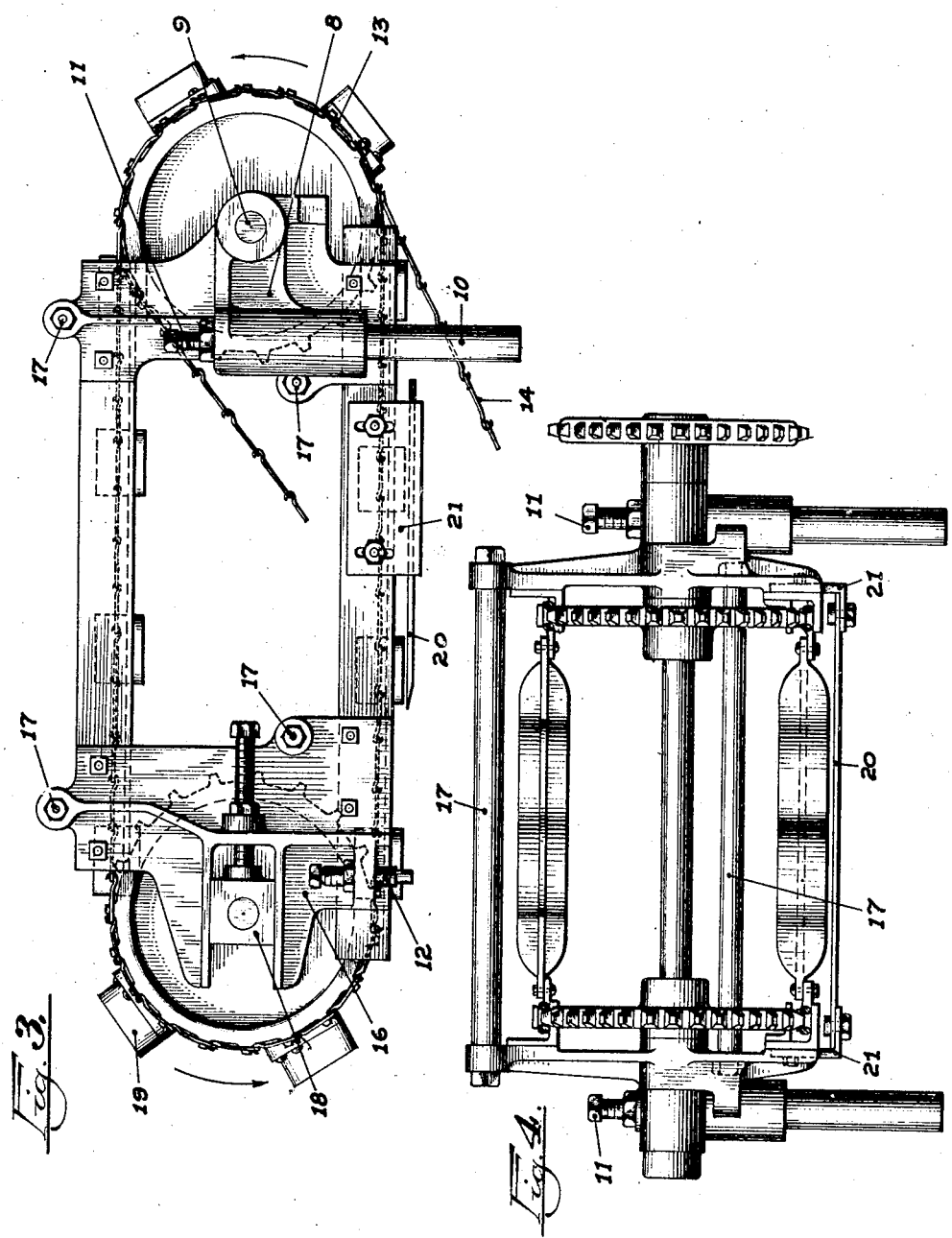
Inventor:
Harold R. Lewis.

March 11, 1930.    H. R. LEWIS    1,750,414
MACHINE FOR TREATING TOMATOES
Filed March 26, 1925    4 Sheets-Sheet 4
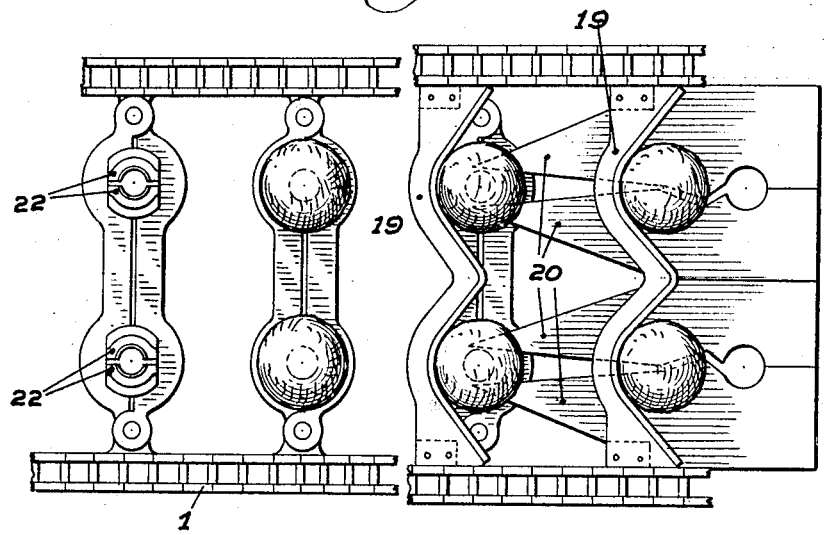
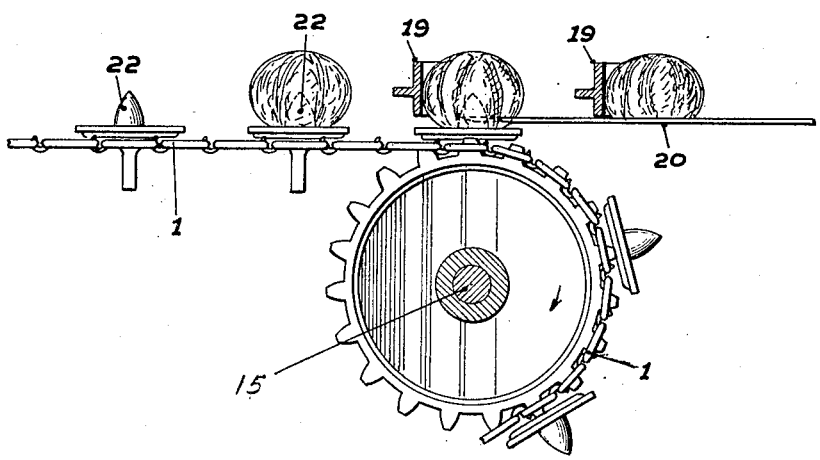
Inventor
Harold R. Lewis
By G. H. Graham Patented Mar. 11, 1930

1,750,414

UNITED STATES PATENT OFFICE

HAROLD R. LEWIS, OF HOOPESTON, ILLINOIS, ASSIGNOR TO SPRAGUE-SELLS CORPORATION, OF HOOPESTON, ILLINOIS

MACHINE FOR TREATING TOMATOES

Application filed March 26, 1925. Serial No. 18,533.

This invention relates in general to an automatic machine for treating ripe tomatoes preparatory to placing them in sealed containers in the ordinary processes of canning.

This invention is an improvement on tomatoe treating machines of the general type as disclosed in Patent 1,479,004 issued to Ivan C. Morgan January 4, 1924.

In the treatment of tomatoes preparatory to canning it is the present practice to subject the ripe tomatoes to either a steam or a hot water bath to loosen the skins, and at the same time, or by subsequent operation, remove the core, and where a green portion is present at the stem end of the tomato, to remove this portion by a hand cutting operation.

These several operative treatments have been variously applied through many different methods. The particular method comprised in the present invention involves the use of automatic means entirely and in every step, except the very first, which consists in placing the tomatoes, singly, in the machine by hand.

A series of coring knives arranged in spaced relation and on a suitable conveyor system form the main supports for the tomatoes as they are conveyed through the machine and subjected to the various operative treatments.

The tomatoes are placed by hand, with stem end downward, on the coring knives, one tomato on each knife, the conveyor carrying the knives having continuous movement imparted thereto by suitable drive means.

The tomatoes are immediately carried into and through a steam box or compartment where they are subjected to the action of steam to loosen the skins.

While they are passing through the steam box, mechanism comes into play that causes the coring knives to close in a manner to cut out and remove the core from each tomato, which core drops through the knife into a receiving hopper and passes from the machine.

Just before the tomatoes leave the steam box, each is subjected to a spray of cold water which has the effect of quickly shrinking and thus cracking the heated skin so that its subsequent removal will be greatly facilitated.

When the tomatoes have left the steam box they are conveyed into the operative zone of my improvement to this type of machine.

My improvement consists of an automatic mechanism for engaging the stem end of each tomato as it rests on the coring knife unit and by means of suitably arranged and disposed cutting elements remove the green end of the tomato before it is discharged from the machine. Thus my improvement converts the simple coring machine into a combined coring and slicing machine.

It is, therefore, a principal object of my invention to provide a full automatic machine for steaming, coring and slicing the green stem end from ripe tomatoes.

It is a further object of my invention to provide a full automatic machine for the purpose specified that shall embody special features of accessibility and operation that will give it a high degree of efficiency.

It is also an object of my invention to provide a machine for steaming, coring and otherwise treating ripe tomatoes whereby variable amounts of the stem ends of tomatoes may be removed by automatic means.

It is also an object of my invention to provide a machine for the purpose specified that shall have a manually manipulative mechanism for treating ripe tomatoes that is held in operative position by means of gravitational action, and by no other means, to thus afford immediate manipulation where necessary and replacement into operative position without the necessity of handling or manipulating fastening devices.

It is a further object of the invention to provide a machine for the purpose specified that will be simple and substantial in construction and made of interchangeable and easily obtainable parts for replacement from ordinary wear or accidental breakage.

With such objects in view as well as other advantages inherent in the invention, the novel structural peculiarities, novel organization of elements, and the separative and collective operations involved in carrying out the recited objects on my invention, which will be made the subject matter of claims hereto appended, I wish it understood that the several necessary elements and combinations constituting the same may be varied in their proportions, placement, general arrangement and operative relation without departing from the scope and nature of my invention.

In carrying out the objects of my invention in a concrete form or machine, further objects, advantages and improvements have been evolved than have been recited, and in order to make the invention more clearly understood there are shown in the accompanying drawings, means and mechanism embodying the preferred structural arrangement and the preferred disposition of the different parts and combinations, in which I have simply illustrated one way of embodying the creative part or conception of the invention in a concrete form or machine, and in so doing I do not wish to limit the claims to the exact details of construction shown.

The described devices are simply embodiments of the invention which other structures might also employ and some of the parts and combinations of parts may be used without the others in different types of such machines without departure from the purview of my invention and I regard myself as entitled to such variations from the shown and described devices as fall within the scope and meaning of the claims hereto appended.

In referring now to the drawings accompanying this application where a clearer and better understanding of the general operation and arrangement of the machine will be had, I want to point out that these drawings are more or less diagrammatic in character; are not necessarily drawn to scale, neither do they necessarily represent the best or the preferred engineering practices in connection with the construction of this type of machine, also that the proportions and relations of some of the parts may be more or less exaggerated in size or shape to better illustrate the application of the invention to an operative machine.

Fig. 1 of the drawings is a side elevation of a complete machine embodying my invention. In this view is shown my improved mechanism in normal operative relation to the other elements of the machine, and in dotted lines the approximate inoperative position. A part of the conveyor chain has been omitted on the under side of the machine.

Fig. 2 is an enlarged plan of the end of the machine containing my improvement and is the right end of Fig. 1.

Fig. 3 is an enlarged side elevation of my improvement to this type of machine, shown separated from the rest of the machine so that its construction and operation will be clearly understood.

Fig. 4 is an end view of Fig. 3.

Fig. 5 is a plan of a portion of the rear end of the machine, showing only the conveyor for carrying the tomatoes; the conveyor for receiving them from the first conveyor and the slicing knives, with tomatoes in position being operated upon.

Fig. 6 is a side elevation of the mechanism of Fig. 5 and very clearly illustrates just how the conveyor carrying the tomatoes on the coring knives delivers each tomato to the auxiliary conveyor which carries them over the slicing knives.

On account of my invention comprising only an improvement on the Morgan coring machine I do not deem it necessary to go into a detailed description of the coring machine proper and its operation further than to just briefly describe this operation in connection with my improved apparatus operating in connection therewith.

By reference to Figs. 1, 2 and 3 the general arrangement and construction of a machine embodying my invention will be clearly understood.

Fig. 1 shows where the tomatoes are placed on the coring knife supports and as they are moved forward by the conveyor 1 they are carried into the steam box 2 and there treated to a bath of steam to swell and loosen the skins. As they are moved forward the lever ends of the coring knives are engaged by the cam plates which causes the knives to close within the tomato and cut and loosen the core, which usually drops out through the knives into the long hopper underneath the steam box from which it gradually passes from the machine.

Before the hot tomatoes pass from within the steam box a spray of water is turned onto them to quickly shrink and crack the skin so that it may be easily removed in subsequent operations. This water spray is provided through the pipe and fitting indicated generally by the numeral 4.

In case that cores or pieces of tomatoes should stick to the coring knives and not drop therefrom means are provided at the under rear part of the machine in the shape of additional spray nozzles indicated by the numeral 5 for cleaning the knives and chain.

As soon as the cored tomatoes leave the steam box they immediately pass into the operative zone of my improvement. Fig. 1 shows my apparatus in operative position on the rear end of the coring machine, while the dotted lines shows it in elevated or inoperative position.

Before going into a detailed description of my tomato slicing apparatus I will first describe its attachment to the rear of the coring machine.

The coring machine frame work is extended as at 6 and carries pivot bearing blocks 7, which form the sole attachment of the slicing apparatus to the coring machine. The slicing machine comprises a frame work of which the members 8 are main portions and carry the shaft 9 and are mounted for vertical adjustment on the rods 10 carried by the bearing blocks 7, the vertical adjustment being accomplished by the adjusting screws 11.

The front end of the slicing machine is supported on adjusting screws 12 resting on the frame members 6 of the coring machine.

In order to swing the slicing mechanism up out of operative position it is grasped by the front end and swung around the shaft 9 as a pivot into the position shown by the dotted lines, the brackets 8 forming the pivotal support for the shaft 9.

Motion is transmitted to the conveyor 13 of the slicing mechanism by means of the chain drive 14 leading from the main drive shaft 15 over suitable sprockets.

By referring now to Figs. 5 to 9 I will refer more in detail to the slicing mechanism proper.

While the frame members 8 support the rear end of the slicing mechanism a companion pair of frame members 16 support the front end of the mechanism, these two pairs of frame members being spaced and bound together by the tie rods 17 carry the entire slicing mechanism. The members 16 are provided with adjustable bearing blocks 18 to provide take up means for the conveyor chain forming a part of this mechanism.

The conveyor chain 13 carry flights of a special shape and contour as is clearly shown in Fig. 7 where these flights are indicated by the numeral 19, see also Fig. 8.

Located on the under side of the slicing mechanism are a battery of slicing knives mounted parallel with the path of travel of the conveyor flights and spaced a predetermined distance therefrom, these knives being indicated by the numeral 20. They are held in operative position and carried by adjustable knife brackets 21.

Operation

The operation of my improved slicing mechanism when applied as I have shown it in this application will be approximately as follows. If it is combined with another type of machine or in other combinations than I have shown, it might be considerably different.

I will only consider the operation from the time the tomatoes leave the steam box.

Figs. 8 and 9 will illustrate the operation rather better than the other views.

By reference to these figures it will be observed that the tomatoes are carried on the coring knives 22, also that the conveyor chain and flights 19 overlap the rear end of the conveyor carrying the coring knives, see Fig. 1.

The flights 19 on the slicing conveyor are so timed relative to the coring knives 22 that they follow closely thereafter in their continuous movement forward.

It will also be noted that the points of the slicing knives 20 extend back of the vertical center of the rear shaft 15 of the coring machine conveyor, when standing at the rear of the machine. The tomatoes being supported on the coring knives are all accurately spaced both longitudinally and laterally so that each tomato will always arrive at exactly the same time relative to the flights on the slicing conveyor, and as the flights on the slicing conveyor are timed to approach closely behind each tomato they are in position to engage each tomato just as the coring knives deliver them to the slicing knives. This is very clearly shown in Fig. 9. Here is shown a tomato just being engaged by the points of the slicing knives, and the same in Fig. 8, and the coring knife will immediately begin to withdraw from the tomato on account of passing around the sprocket over which the conveyor 1 passes. The flights 19 have engaged the tomato from the back and as the two conveyors move at the same lineal speed, the coring knife will be withdrawn while the tomato is being pushed over the slicing knives 20, and since the slicing knives enter the tomato before the coring knives begin to release the tomato, it is fully supported all of the time.

The flights 19 moving parallel with the plane of the slicing knives hold the tomato in proper position during the entire travel through the machine, so that the green stem end will be most effectively removed, and the same amount will be removed from each tomato regardless of its size, since the amount sliced off is determined entirely by the relative adjustment between the slicing knife and the support of the coring knives.

The slicing knives are pointed and have converging cut edges where the tomatoes are first engaged. This is necessary to permit the coring knives to pass without contact with the slicing knives as they move down over the contour of the sprocket.

The slicing knives 20 converge almost to a point of contact when the cutting line is given an angular path which gives a peculiar shearing cut that will effectively sever any stringy part of the tomato or core part. The cut edge ends in a circular contour which acts to finally sever the last vestige of attachment and permit the severed green stem end to drop, and the treated tomato to fall in the chute 23, Fig. 3 and pass away from the machine.

The amount or thickness of green stem end of the tomato to cut off is determined by the condition of ripeness of the tomatoes. If they are fully ripe there would only be a very thin slice removed, while if they were not fully ripe a thicker slice would be cut off. The thickness of slice to cut off is controlled by the relative adjustment of the slicing knives to the coring knife supports and this is regulated by adjusting the knife holders 21, farther away or nearer to the coring knife supports.

The shape of the flights 19 are such that they will pocket each tomato and hold it in alignment with the slicing knives and prevent any lateral movement.

If more vertical adjustment is necessary for the slicing knives than can be conveniently accomplished by adjusting the knife holders 21, the entire mechanism may be adjusted by means of the adjusting screws 11 and 12.

Having thus described my invention what I claim as new and desire to cover by Letters Patent is:

1. In a machine for treating tomatoes comprising a conveyor and slicing means for removing a portion from the outside of each tomato, said conveyor and slicing means being part of a pivoted mechanism capable of elevation from its operative position by swinging on said pivot.

2. In a machine for treating tomatoes comprising an initial conveyor and slicing means for removing a portion from the outside of each tomato, said slicing means consisting of a conveyor and slicing knives, a frame work for supporting said conveyor and knives and a pivot on which said frame work and associated parts may swing out of its operative position relative to said initial conveyor.

3. A slicing mechanism for removing the stem end from tomatoes comprising a main conveyor for delivering tomatoes to said slicing mechanism, a swinging framework supporting said slicing mechanism and means for adjusting the operative relation of said main conveyor and said slicing mechanism whereby the thickness of slice may be regulated.

4. A slicing machine for trimming the stem end from tomatoes comprising conveying means, tomato supporting means, cutting means and power means, a frame member on which said means are mounted, a pivotal connection for said frame member, an initial conveyor for delivering tomatoes to said slicing machine, the said pivotal connection permitting said slicing machine to be moved into or out of operative relation with said initial conveyor.

5. A tomato slicing mechanism comprising a framework mounted in a horizontal position, one end of said framework having pivotal connection and the other having an unattached support, an endless conveyor and slicing means carried by said framework, an initial conveyor for supplying tomatoes to said mechanism and adjustable means for adjusting said slicing means relative to said initial conveyor.

6. A machine for treating tomatoes comprising an endless conveyor for initially receiving and moving tomatoes, a pivoted frame member located adjacent the delivery end of said initial conveyor, an endless conveyor carried by said frame member and adapted to receive tomatoes from said initial conveyor, severing knives mounted on said pivoted member and having vertical adjustment relative to the path of travel of the tomatoes, said frame member, conveyor and slicing knives being movable away from the operative position by swinging on said pivot.

7. A machine for treating tomatoes comprising an initial endless conveyor for receiving and moving whole tomatoes, a pivoted frame member located adjacent the delivery end of said initial conveyor, an endless conveyor on said frame member adapted to receive tomatoes from said initial conveyor, the flights of said conveyor being pocketed to maintain each tomato in a fixed relation, knives on said frame member for slicing a portion from each tomato, said frame member, conveyor and slicing knives being movable away from operative position on said pivot.

8. A machine for slicing a portion from the stem end of tomatoes comprising an initial conveyor for receiving and moving tomatoes along a fixed path in a horizontal plane, a pivoted frame member located above the horizontal path of the moving tomatoes, a conveyor on said frame member, pocketed flights on said conveyor, slicing knives underneath said conveyor, all cooperating to receive tomatoes in succession from said initial conveyor and remove a slice from the stem end thereof, said frame member, conveyor and slicing knives being movable away from operative position on said pivot.

9. A machine for slicing a portion from the stem end of tomatoes comprising an initial conveyor having means for receiving and moving tomatoes in spaced relation both longitudinally and laterally, a pivoted frame member located above the line of travel of said initial conveyor, pocketed flights and a conveyor carried by said frame member, means for driving said flights and conveyor through said pivot, slicing knives positioned below the line of travel of said flights, means for giving vertical adjustment to said knives relative to said initial conveyor to thereby regulate the thickness of slice, said frame member, flights, conveyor and slicing knives being swingable on said pivot to move them away from the operative position.

10. A tomato slicing mechanism to be used in conjunction with a tomato treating machine comprising a pivoted frame member, drive means through said pivot, an endless conveyor driven from said pivot, adjustable means supporting said conveyor on said frame member opposite said pivot, pocketed flights on said conveyor, slicing knives below said flights for slicing a portion from tomatoes and acting as supports for said tomatoes at the same time and means for adjusting said knives to regulate the thickness of slice removed therefrom.

11. A machine for treating tomatoes comprising an endless conveyor for initially receiving and moving tomatoes, a movable frame member located adjacent the delivery end of said initial conveyor, an endless conveyor carried by said frame member and adapted to receive tomatoes from said initial conveyor, severing knives mounted on said movable member and having vertical adjustment relative to the path of travel of the tomatoes, said frame member, conveyor and slicing knives being movable away from the operative position with said initial conveyor.

In testimony whereof I affix my signature.

HAROLD R. LEWIS.